United States Patent [19]

Kataoka et al.

[11] Patent Number: 4,921,434
[45] Date of Patent: May 1, 1990

[54] APPARATUS FOR MAKING CONNECTIONS IN LIQUIDS USING PRESSURIZED GAS

[75] Inventors: Hajime Kataoka; Minoru Gunji, both of Oarai, Japan

[73] Assignee: Doryokuro Kakunenryo Kaihatsu Jigyodan, Tokyo, Japan

[21] Appl. No.: 281,735

[22] Filed: Dec. 9, 1988

Related U.S. Application Data

[62] Division of Ser. No. 123,010, Nov. 19, 1987, Pat. No. 4,815,989.

[30] Foreign Application Priority Data

Nov. 27, 1986 [JP] Japan .................................. 61-282658

[51] Int. Cl.[5] ......................................... H01R 13/523
[52] U.S. Cl. .................................... 439/198; 439/199; 439/205; 439/374; 439/426
[58] Field of Search .............. 439/190, 191, 198–205, 439/426, 374–381

[56] References Cited

U.S. PATENT DOCUMENTS

| | | | |
|---|---|---|---|
| 3,471,826 | 10/1969 | Hutter et al. | 439/198 |
| 3,596,231 | 6/1971 | Melton | 439/426 |
| 4,073,562 | 2/1978 | Karlskind | 439/199 |
| 4,304,452 | 12/1981 | Kiefer | 439/199 |

FOREIGN PATENT DOCUMENTS

| | | | |
|---|---|---|---|
| 2254891 | 7/1975 | France | 439/201 |
| 1112414 | 5/1968 | United Kingdom | 439/138 |
| 1528351 | 10/1978 | United Kingdom | 439/198 |

Primary Examiner—Neil Abrams
Attorney, Agent, or Firm—Armstrong, Nikaido, Marmelstein, Kubovcik & Murray

[57] ABSTRACT

Disclosed are a method of making a connection in a liquid and an apparatus therefor wherein a first connector having a protrusion at its front end is housed in a protecting tube which is open at its lower end and into which a gas is introduced, the protecting tube is filled with the gas so as to form a gaseous space therein within the liquid, a second connector which is normally held within the liquid and which has a destructible plate at its upper end is exposed to the gaseous space, and the destructible plate is destroyed by the front end of said one connector so as to connect both connectors, whereby the connection in the liquid can be made without being affected by an ambient liquid.

15 Claims, 16 Drawing Sheets

FIG. 2(A)
FIG. 2(B)
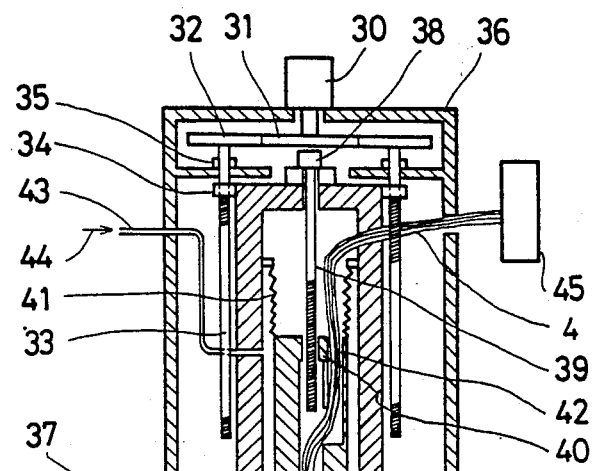
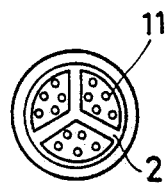
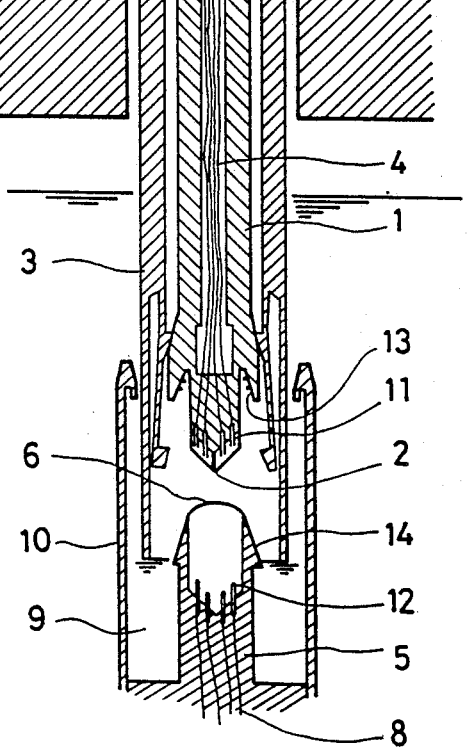

Section A-A

FIG.13(A)
FIG.13(B)
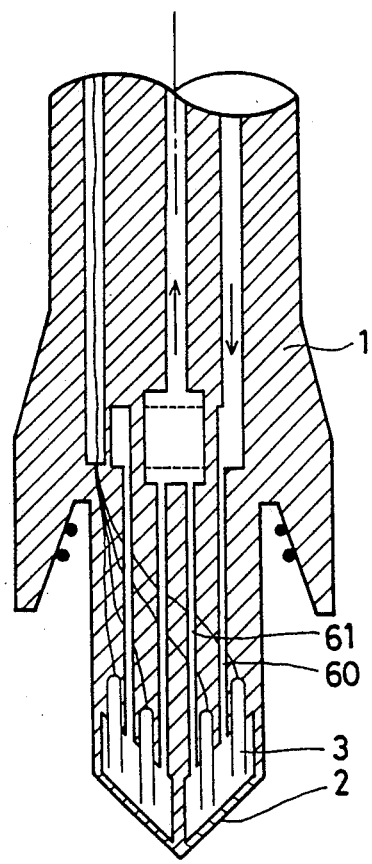
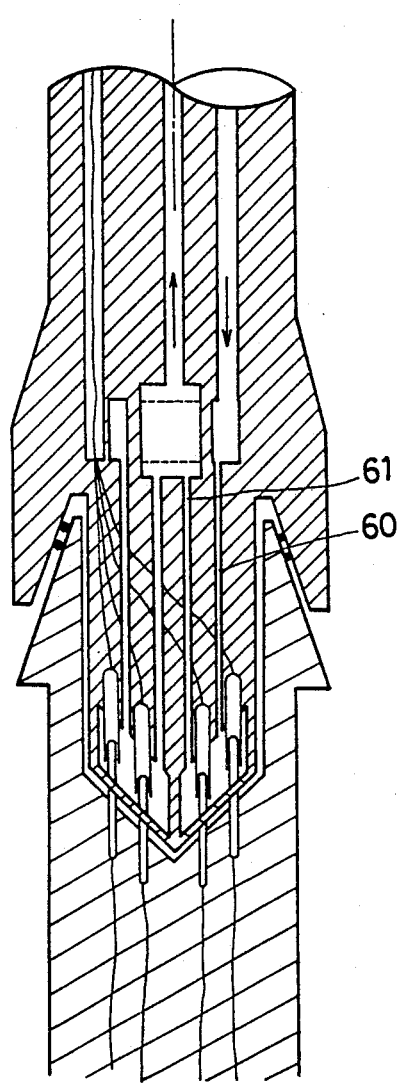

Under test ← | → For unloading

APPARATUS FOR MAKING CONNECTIONS IN LIQUIDS USING PRESSURIZED GAS

This is a division of application Ser. No. 123,010, filed Nov. 19, 1987, now U.S. Pat. No. 4,815,989.

BACKGROUND OF THE INVENTION

The present invention relates to a method of making connections in liquids and an apparatus therefor in which the electrical connections are made in the liquids by the use of connectors capable of having their electrical connection portions attached to and detached from each other without being affected by the ambient liquids.

In general, in the sodium of a fast breeder reactor, the water of a light-water nuclear reactor and the various liquids of chemical plants and the like, connectors in the transmission paths of electric signals, fluid pressure signals etc. need to be attached and detached without being affected by the ambient liquids.

By way of example, in the experimental reactor "JOYO" of the Power Reactor and Nuclear Fuel Development Corporation, various irradiation tests are conducted using a fuel assembly for irradiation which has the same configuration as that of an ordinary fuel assembly for burnup. In such an experiment, it is required that the irradiating fuel assembly be placed in and removed from the nuclear reactor.

First, a fuel shuffling operation in a conventional nuclear reactor will be described with reference to FIG. 15.

FIG. 15 is a view for explaining the fuel shuffling operation of the nuclear reactor, in which numeral 70 designates a reactor vessel, numeral 71 a fuel assembly for burnup, numeral 72 sodium liquid, numeral 73 a reactor core, numeral 74 a fuel assembly for irradiation, numeral 75 an irradiating-fuel-assembly manipulator, numeral 76 a fuel handling machine, numeral 77 a rotary plug, and numeral 78 a fuel loader/unloader.

In the illustrated reactor, the burnup fuel assembly 71 is transferred within the reactor vessel 70 by the combination of the fuel handling machine 76 and the rotary plug 77, while it is loaded into or unloaded from the reactor vessel 70 by the fuel loader/unloader 78.

FIG. 16 is a view for explaining the charging of the irradiating fuel assembly in the reactor, the left side of which shows the state under test and the right side the state for unloading the fuel assembly. In the Figure, numeral 79 designates electric wires for measurement, numeral 80 the top of the irradiating fuel assembly, numeral 81 a holding claw, and numeral 82 a cutter.

In a case where the irradiating fuel assembly 74 is to be loaded in the reactor, it cannot be handled with the fuel handling machine 76 or the fuel loader/unloader 78 because the measuring electric wires 79 for the measurement outside the reactor extend out of the top of the irradiating fuel assembly 74, and because no technique for connecting and disconnecting the measuring electric wires 79 in the sodium liquid 72 within the reactor vessel 70 without being affected by the liquid is available at present. Therefore, the irradiating fuel assembly 74 is inserted from above the rotary plug 77 into the core 73 within the reactor vessel 70 along with the irradiating-fuel-assembly manipulator (referred to as the "manipulator" hereinafter) 75 in a state where the irradiating fuel assembly 74 is unitarily coupled to the manipulator 75 through the holding claws 81 provided at the fore end of the manipulator 75 and the measuring electric wires 79 are arranged down to the interior of the irradiating fuel assembly 74 without any connective parts.

After the test, the irradiating fuel assembly 74 cannot be extracted through the reverse procedure because it will be radioactive. Therefore, the cutter 82 provided at the fore end of the manipulator 75 is driven to cut the measuring electric wires 79 as shown on the right side of the figure, whereupon the holding claws 81 are released to separate the manipulator 75 and the irradiating fuel assembly 74. Under these conditions, the top 80 of the irradiating fuel assembly 74 can be handled with the fuel handling machine 76 and the fuel loader/unloader 78, so that the irradiating fuel assembly 74 can be taken out by the same means as that used for the ordinary burnup fuel assembly 71.

However, this prior-art system for handling the irradiating fuel assembly has the following problems:

(1) Since the measuring electric wires are cut at the fore end of the manipulator, the sodium liquid, which is electrically conductive, intrudes into the measuring electric wires and breaks down the insulation, thus making it necessary to lay measuring electric wires again for the next test. However, since the manipulator has a slender structure, it must be cut into small sections in order to exchange the measuring electric wires, and this method is costlier than the fabrication of a new manipulator. Eventually, the manipulator is fabricated for each fuel assembly for irradiation, thereby raising the cost of the irradiation test.

(2) As a result, the manipulators inevitably have a one-to-one relationship with respect to the irradiating fuel assemblies. Even if the manipulator and the irradiating fuel assembly are later scrapped, they need to be washed on each occasion on account of the adhesion of sodium. This increases the amount of radioactive waste liquid. Moreover, it is required that the manipulator be handled as a radioactive waste on account of its use inside the nuclear reactor. This increases the quantity of solid waste.

(3) When the irradiating fuel assembly with the measuring electric wires is inserted into the reactor before the fuel shuffling operation which requires the turning of the rotary plug, the latter cannot be turned for fear of severing the wires. Accordingly, the insertion of the irradiating fuel assembly must be carried out later than the fuel shuffling operation of the reactor core, and restrictions are imposed on the preparation of a reactor running schedule.

SUMMARY OF THE INVENTION

The present invention has been devised in order to solve the problems mentioned above, and its object is to provide a method of making connections in liquids and an apparatus therefor in which electrical connection portions can be connected and disconnected without being wetted by the liquids.

According to the present invention, the method of making connections in liquids is characterized by comprising filling a protective tube, which is open at its lower end and in which a first connector having a protrusion at a front end thereof is housed, with a gas so as to form a gaseous space therein within the liquid, exposing a second connector which has a destructible plate at its upper end and which is immersed in liquid, to the gaseous space, and destroying the destructible plate of the second connector with the front end of the first connector, thereby to connect both of the connectors.

According to the present invention, the apparatus for making connections in liquids is characterized by comprising a protective tube which is open at its lower end and into which a gas is introduced, a first connector which is connected to a front end of a cable, which is held within the protective tube in vertically movable fashion and which has a protrusion at its front end, and a second connector which is normally immersed in the liquid and is exposed for connection purposes to a gaseous space formed in the protective tube and which has at its front end a destructible plate adapted to be destroyed by the protrusion of the first connector.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1(A) and 1(B) are views for describing the basic principle of the present invention, in which FIG. 1(A) shows a state before connection, and FIG. 1(B) shows a connected state;

FIGS. 2(A) and 2(B) show an embodiment of a connection apparatus according to the present invention, in which FIG. 2(A) is a vertical sectional view of the apparatus, and FIG. 2(B) is a bottom view of the protrusion of a connector on one side;

FIGS. 4(A) through 4(C) are views for describing the connective mechanism of the connection apparatus, in which FIG. 4(A) shows a state before connection, FIG. 4(B) shows a state with a destructible plate destroyed, and FIG. 4(C) shows a state with the connection completed;

FIG. 7(A) through 7(E) are views for describing the circumferential angle adjustment of both connectors and the correction of a circumferential deviation, in which FIG. 7(A) is a sectional view of both the connectors before connection, FIG. 7(B) is a sectional view taken along line A—A in FIG. 7(A), FIG. 7(C) is a partial perspective view for elucidating the correction of the angular deviation, FIG. 7(D) is a sectional view for elucidating the correction of the angular deviation, and FIG. 7(E) is a view showing a pin array in the case of the connector for a hexagonal fuel assembly;

FIGS. 8(A) and 8(B) show another embodiment for correcting the circumferential deviation of both the connectors, in which FIG. 8(A) is a sectional view of the front end parts of both the connectors before connection, and FIG. 8(B) is a partial perspective view for elucidating the correction of the angular deviation;

FIGS. 13(A) and 13(B) show another embodiment of the present invention permitting the cleansing and drying of connection portions, in which FIG. 13(A) is a sectional view of the front end of the connector on one side, and FIG. 13(B) is a view showing the mated state of the connectors on both sides;

FIGS. 14(A) through 14(C) show another embodiment of the present invention provided with a drain port, in which FIG. 14(A) is a sectional view of the front end of the connector on one side, and FIG. 14(B) is a sectional view of the front end of the connector on the other side, and FIG. 14(C) is a view showing the mated state of the connectors on both sides;

DESCRIPTION OF THE PREFERRED EMBODIMENT

Embodiments of the invention will now be described with reference to the drawings.

Figure 1A:
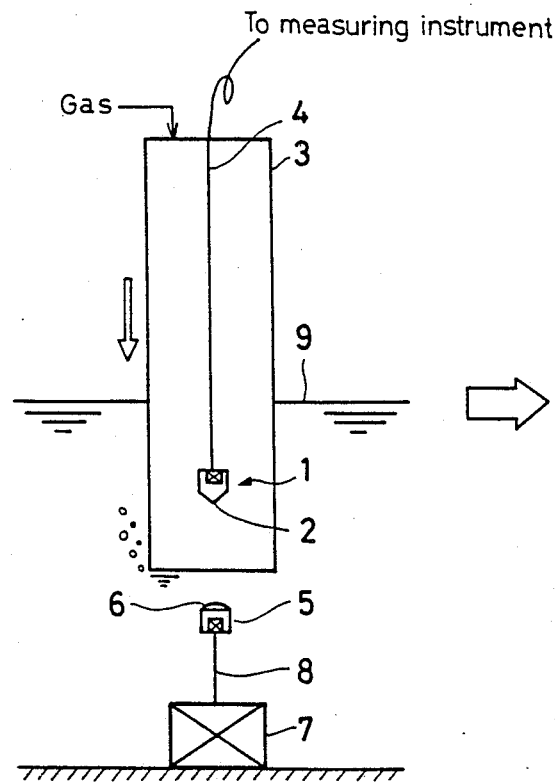
Figure 1B:
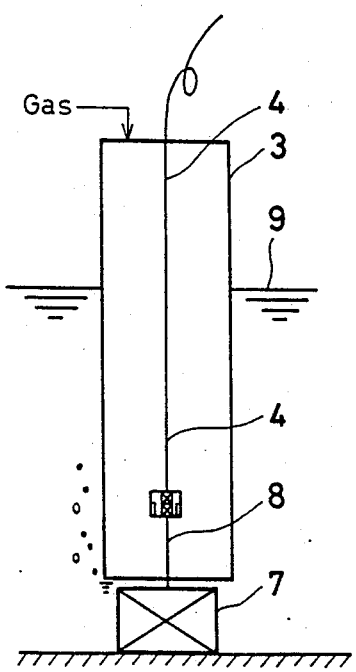

FIGS. 1(A) and 1(B) are views for describing the basic principle of the present invention, in which FIG. 1(A) shows a state before connection, and FIG. 1(B) shows a connected state. In the figures, numeral 1 designates connector A, numeral 2 a protrusion, numeral 3 a protecting tube, numerals 4 and 8 electric wires for measurement, numeral 5 a connector B, numeral 6 a destructible plate, numeral 7 a signal source, and numeral 9 sodium liquid.

Referring to the figures, the connector A 1 having the protrusion 2 at its front end is housed in the protecting tube 3 which is open at its lower end. The protecting tube 3 is filled with a gas which is compressedly fed against the pressure of the sodium liquid, so that a gaseous space is formed in the protecting tube 3 within the liquid. Even when the protecting tube 3 is submerged, the connector A 1 is not submerged in the liquid 9 and does not become wet. On the other hand, the connector B 5 present in the sodium liquid 9 has its upper end covered with the destructible plate and is held in a tightly closed state. Thus, as the protecting tube 3 is submerged, the connector B 5 is exposed to the gaseous space formed in the protecting tube 3 until the destructible plate 6 is destroyed by the protrusion 2 provided at the front end of the connector A 1. The connectors A and B are then connected in the gaseous space as illustrated in FIG. 1(B). In this way, the connectors can be connected without being affected by the ambient liquid, whereupon a signal from the signal source 7 can be transmitted to a measuring instrument, not shown, through the measuring electric wires 8 and 4. It is similarly possible to release the connection in the gaseous space and to draw up the connector A.

When the connector A 1 is drawn up after disconnecting both connectors, the interior of the connector B 5 is wetted with the liquid. However, if the connector B 5 is provided with a drain port into a structure suitable for draining off the liquid and a fluid or gas is blown from the side of the connector A 1 against the connector B 5 in the gaseous space so as to cleanse and dry the connector B, then the connector B can be used repeatedly. In this case, the destructible plate 6 is not always necessary.

Figure 3:
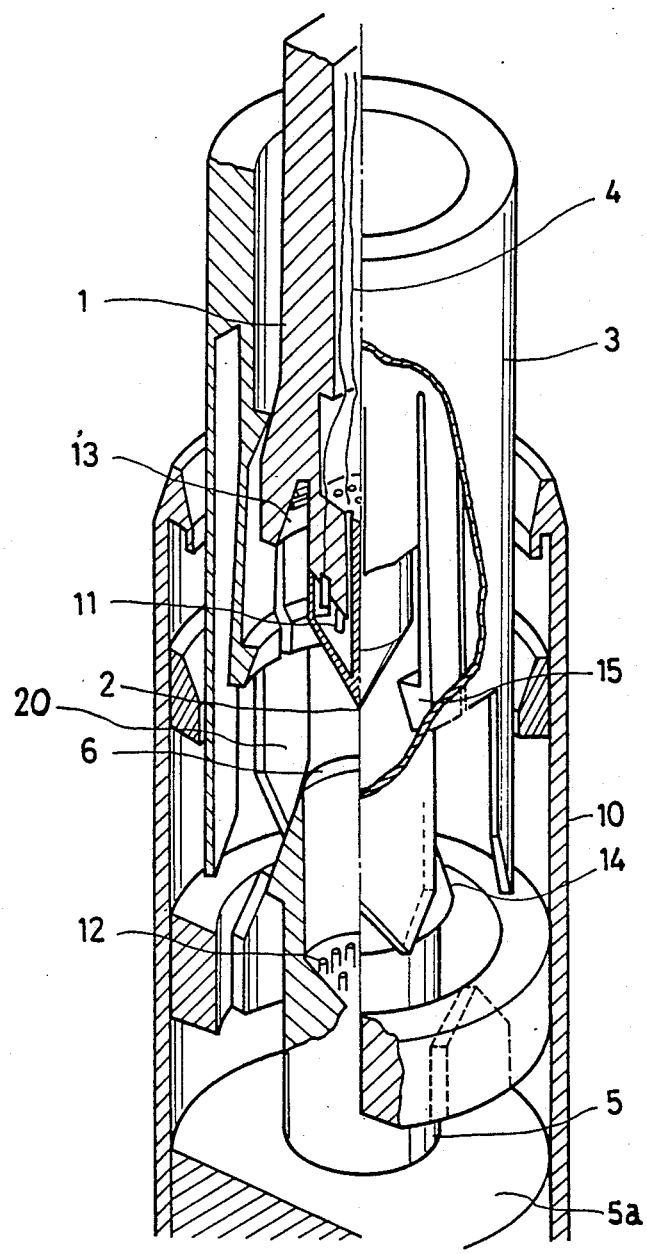
FIG. 3 is a perspective view of essential portions inside the connection apparatus of FIG. 2(A)
Figure 4A:
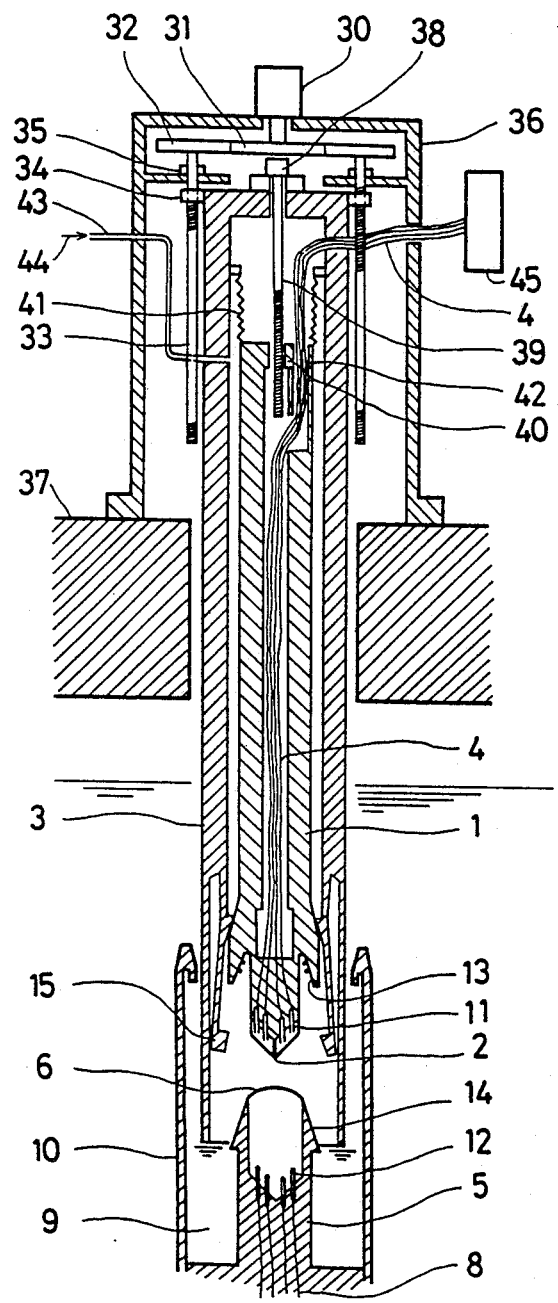
Figure 4B:
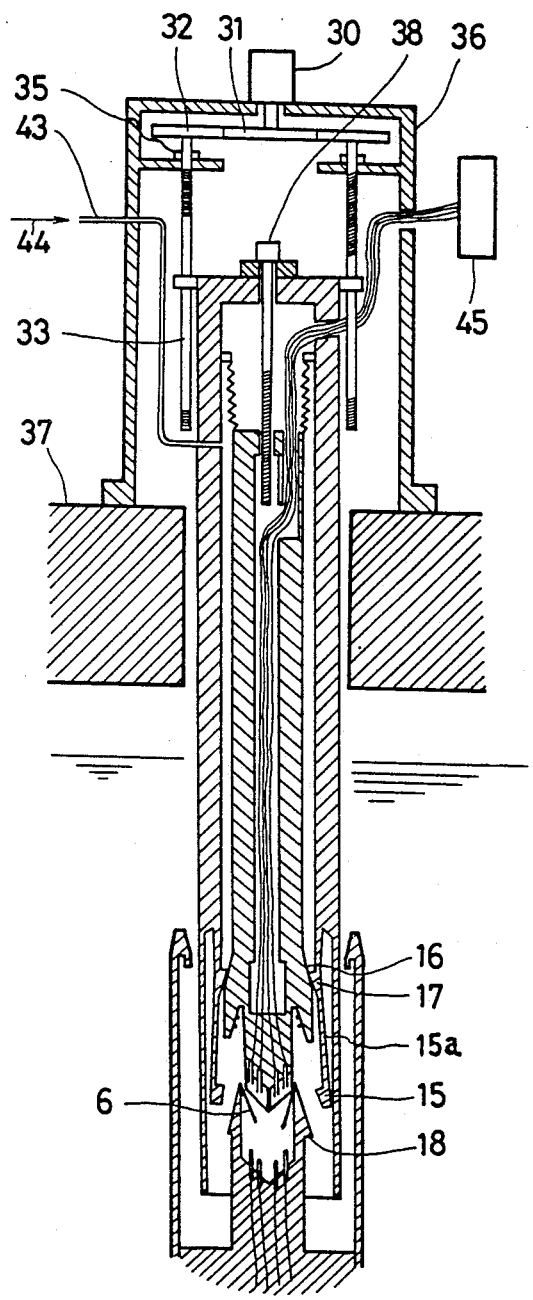
Figure 4C:
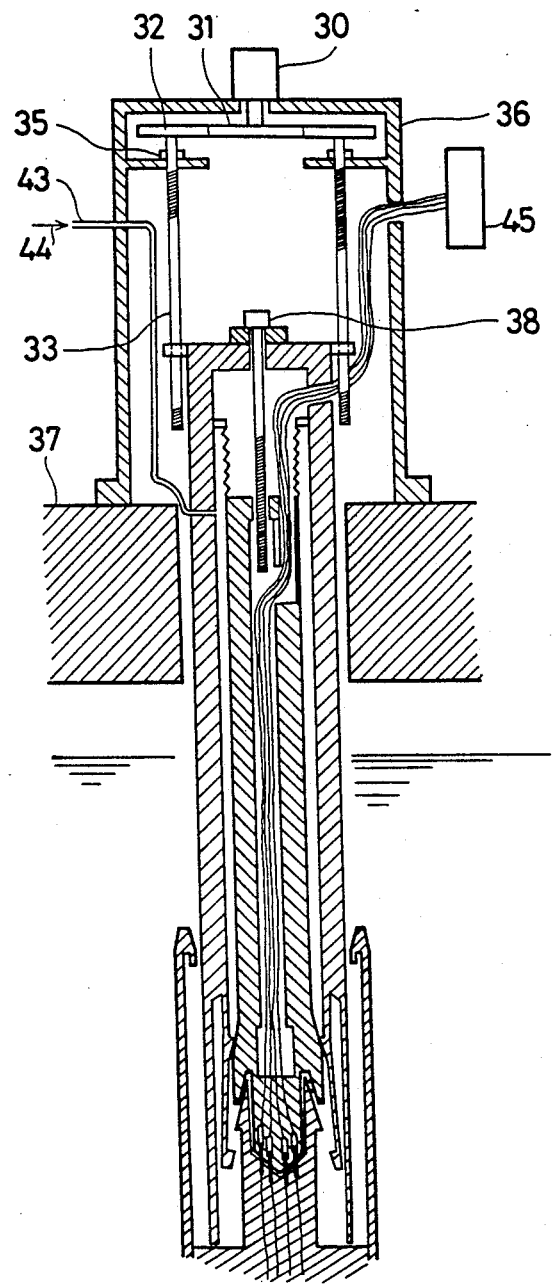

FIGS. 2(A) and 2(B) show an embodiment of a connection apparatus according to the present invention, in which FIG. 2(A) is a vertical sectional view of the apparatus, and FIG. 2(B) is a bottom view of the protrusion 2 of the connector A; FIG. 3 is a perspective view of essential protions inside the connection apparatus in FIG. 2(A); and FIGS. 4(A) through 4(C) are views for describing the connective mechanism of the connection apparatus, in which FIG. 4(A) shows a state before connection, FIG. 4(B) shows a state with the destructible plate destroyed, and FIG. 4(C) shows a state with the connection completed. Throughout these figures, the same numerals as in FIGS. 1(A) and 1(B) indicate identical constituents. In FIGS. 2(A) through 4(C), numeral 10 designates a fuel assembly for irradiation, numerals 11 and 12 connection ends or pins, numerals 13 and 14 sealing surfaces, numeral 15 a pawl, numeral 15a an elastic member, numeral 16 a tapered surface, numeral 17 an inclined projection, numeral 18 a fitting receptacle, numerals 30 and 38 motors, numerals 31 and 32 gears, numerals 33 and 39 ball screws, numerals 34 and 40 ball nuts, numeral 35 a bearing, numeral 36 a supporting casing, numeral 37 a foundation, numeral 41 sealing bellows, numeral 42 a through-hole for the measuring electric wires 4, numeral 43 a gas conduit, numeral 44 a gas to be fed, and numeral 45 an external measuring instrument.

Referring to the figures, the connector A 1 on the upper side forms a drive portion for connecting and disconnecting both the connectors, and the connector B 5 on the lower side forms a connector portion for conducting various irradiation tests.

The connector A 1 has the protrusion 2 at its front end. Provided inside the protrusion 2 is the connection end 11 constituted by a female-electrode multipin structure connected with the measuring electric wires 4 laid and extended from the external measuring instrument 45. When viewed sideways, the protrusion 2 is in the shape of an inverted cone, but when viewed from below, it is open at the connection pins 11 as shown in FIG. 2(B). In addition, the connector A 1 is provided with the sealing surface 13. (Although seal rings are illustrated, a surface-touching seal may be used.)

The connector B 5 is located at the top part of the irradiating fuel assembly 10, and it is provided with the connection end 12 which is constructed of male electrodes adapted to mate with the connection pins 11 of the connector A 1, within a sealed space protected from the sodium liquid 9 by the destructible plate 6. In addition, the connector B 5 is provided with the sealing surface 14 which is brought into close contact with the sealing surface 13 of the connector A 1.

The outer periphery of the connector A 1 is entirely concealed by the protecting tube 3 which can move vertically relative to the connector A 1. The interior of the protecting tube 3 is gas-tight owing to the sealing bellows 41 suspended at the upper part thereof, and the lower end of this protecting tube is open. Therefore, when a gaseous pressure higher than the head pressure of the liquid 9 at the lower end of the protecting tube 3 is kept applied through the gas conduit 43, a gaseous space is formed in the protecting tube 3, and the front end of the connector A 1 can be held in the gaseous space without being wetted with the liquid 9. In this case, when the gas under a pressure high enough to overcome the head pressure is fed into the protecting tube 3, the part of the gas corresponding to a pressure component exceeding the head pressure is emitted from the lower end of the protecting tube 3 into the liquid 9 in the form of bubbles, and the pressure of the gas settles to a fixed pressure equal to the head pressure. Accordingly, whether or not the gaseous pressure in the protecting tube 3 is the fixed pressure equal to the head pressure can be readily known by observing the bubbles emitted from the lower end of the protecting tube 3 or by sensing that a gaseous pressure indicative of the internal pressure of the protecting tube 3 fails to rise in spite of the gas feed.

Next, operations which proceed until the connection of the connector A 1 and connector B 5 of the above construction will be described in conjunction with FIGS. 4(A) through 4(C).

FIG. 4(A) shows the same state as in FIG. 2(A), in which the connector A 1 and the protecting tube 3 have been lowered by the driving mechanism arranged in the upper part of the connection apparatus. Here will be described the construction and operation of the driving mechanism. The ball nuts 34 are disposed at the uppermost part of the protecting tube 3 and are in mesh with the ball screws 33. The ball screws 33 are coupled to the gears 32 which are, in turn, coupled to the gear 31 and the motor 30. Thus, the protecting tube 3 is moved up and down by driving the motor 30.

On the other hand, the ball nut 40 is disposed at the upper end of the connector A 1, and the ball screw 39 which is coupled to the protecting tube 3 at its upper end and which is rotated and driven by the motor 38 is in mesh with this ball nut 40. Thus, the connector A 1 is moved up and down relative to the protecting tube 3 by driving the motor 38.

At first, the destructible plate 6 and tapered surface 14 of the connector B 5 are submerged in the liquid 9 of sodium or the like. However, as the protecting tube 3 is lowered by driving the motor 30, the destructible plate 6 and the sealing surface 14 are soon exposed to the gaseous space formed by the pressure of the gas fed into the protecting tube 3, and the domed destructible plate 6 has the liquid drained off completely, as illustrated in FIG. 4(A).

When the connector A 1 is lowered further, the protrusion 2 of the connector A 1 breaks through the destructible plate 6 of the connector B 5, as illustrated in FIG. 4(B).

When the connector A 1 is lowered still more, the connection end 11 of the connector A 1 and that 12 of the connector B 5 are snugly fitted and electrically connected while extending the broken destructible plate inwards, as illustrated in FIG. 4(C). On this occasion, the sealing surface 13 of the connector A 1 and that 14 of the connector B 5 come into close contact and form a sealing structure. Thus, even when the gaseous pressure in the protecting tube 3 hereinafter lowers to immerse the connector portions in the liquid, the invasion of the sodium into the connection ends is prevented.

In addition, the connection between the connectors A and B can be known from a change in the drive load of the driving motor of the driving mechanism for vertical motion or by means of a position detector (not shown) for the connector A.

Next, the snug fit for ensuring the connection between the connectors A and B will be described.

As shown in FIG. 4(B), the front end of the connector A 1 is peripherally provided with the tapered surface 16 which is flared downwards, and the protecting tube 3 is provided with the pawl 15 which includes the inclined projection 17 butting against the tapered surface 16. The pawl 15 is provided with notches extending from its front end into a comb-line structure (refer to FIG. 3), and is spread out when the inclined projection 17 butts against the tapered surface 16. On the other hand, the fitting portion 18 adapted to engage the pawl 15 at the connection of the connectors A and B is formed under the sealing surface 14 of the connector B 5.

The snug fit can be effected by driving the motors 30 and 38 to raise and lower the connector A 1 relative to the protecting tube 3. More specifically, when both connectors are to be connected, the connector A 1 is moved down to a position where the pawl 15 engages the fitting portion 18, in the state shown in FIG. 4(B) in which the inclined projection 17 opens the pawl 15 in contact with the tapered surface 16. Thereafter, as illustrated in FIG. 4(C), in order to close the pawl 15, the protecting tube 3 is raised relative to the connector A 1 by driving the motors 30, 38 until the tapered surface 16 breaks contact with the inclined projection 17. Pressure can then be forcibly exerted upon the sealing surfaces 13 and 14 of both connectors.

When both connectors are to be disconnected, the connector A 1 is raised. The slant projection 17 then forcibly opens the pawl 15 in contact with the tapered surface 16, and the snug fit between the fitting portion 18 and the pawl 15 can be released.

Next, the correction of the deviation between the central axes of both connectors in the connecting operation will be described with reference to FIGS. 5(A) through 5(C).

Figure 5A:
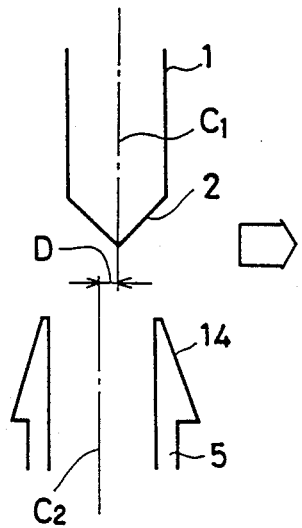
FIG. 5(A) is a view showing the decentered state of both connectors before connection.
Figure 5B:
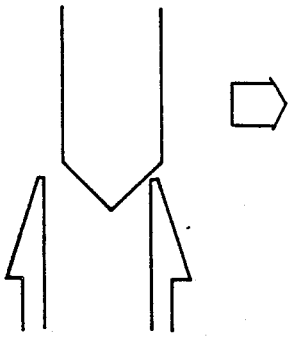
FIG. 5(B) is a view showing the decentered state at a connecting step.
Figure 5C:
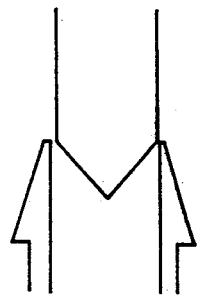
FIG. 5(C) is a view showing a state in which the connectors have been corrected to be centered.

FIG. 5(A) is a view showing the decentered state of both connectors before connection, FIG. 5(B) is a view showing the decentered state at the connecting step, and FIG. 5(C) is a view showing a state in which the decentering has been corrected.

Referring to the figures, the protrusion 2 of the connector A 1 is formed in the shape of the inverted cone with an incline plane, as stated earlier. As a result, even if the central axes $C_1$ and $C_2$ of both connectors involve a deviation D as illustrated in FIG. 5(A), the inclined plane of the protrusion 2 butts against the upper edge of the sealing surface 14 of the connector B 5 as illustrated in FIG. 5(B), and the connector A 1 is inserted along the inclined plane. Thus, the connector A 1 is centered as illustrated in FIG. 5(C) and is connected with the connector B 5. Although the destructible plate 6 not shown in FIGS. 5(A) through 5(C) is present on the upper edge of the sealing surface 14, it is a thin plate extending uniformly in the circumferential direction and therefore is not an obstacle to the correction of the deviation of the central axes.

Figure 6:
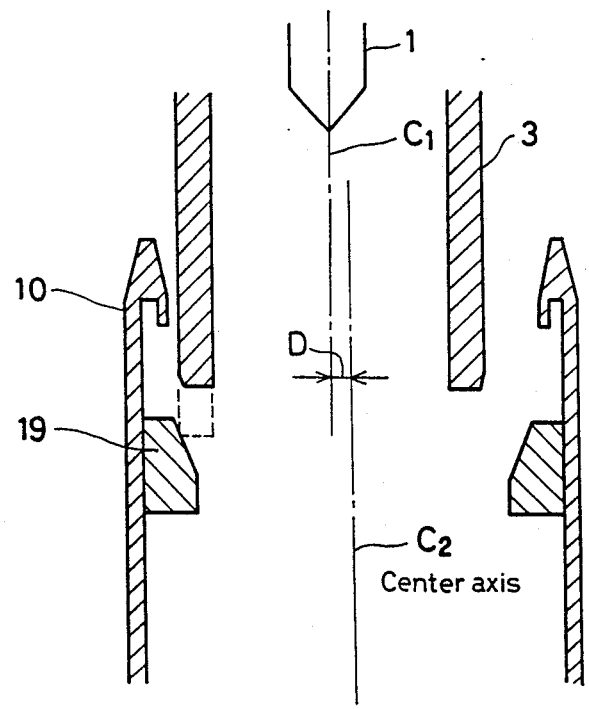
FIG. 6 is a sectional view of essential portions for describing the correction of the decentered state of both connectors.

Alternatively, the deviation D between the central axes of both connectors may be corrected as illustrated in FIG. 6. A guide 19 which has a radially inclined plane is provided inside the upper end part of the irradiating fuel assembly 10, and the front end of the protecting tube 3 is inserted along the inclined surface of the guide 19, whereby the central axis $C_1$ of the connector A 1 is brought into agreement with that $C_2$ of the connector B 5.

The adjustment of the circumferential angles of both connectors and the correction of the circumferential deviation between them will now be described with reference to FIGS. 7(A) through 7(E).

Figure 7A:
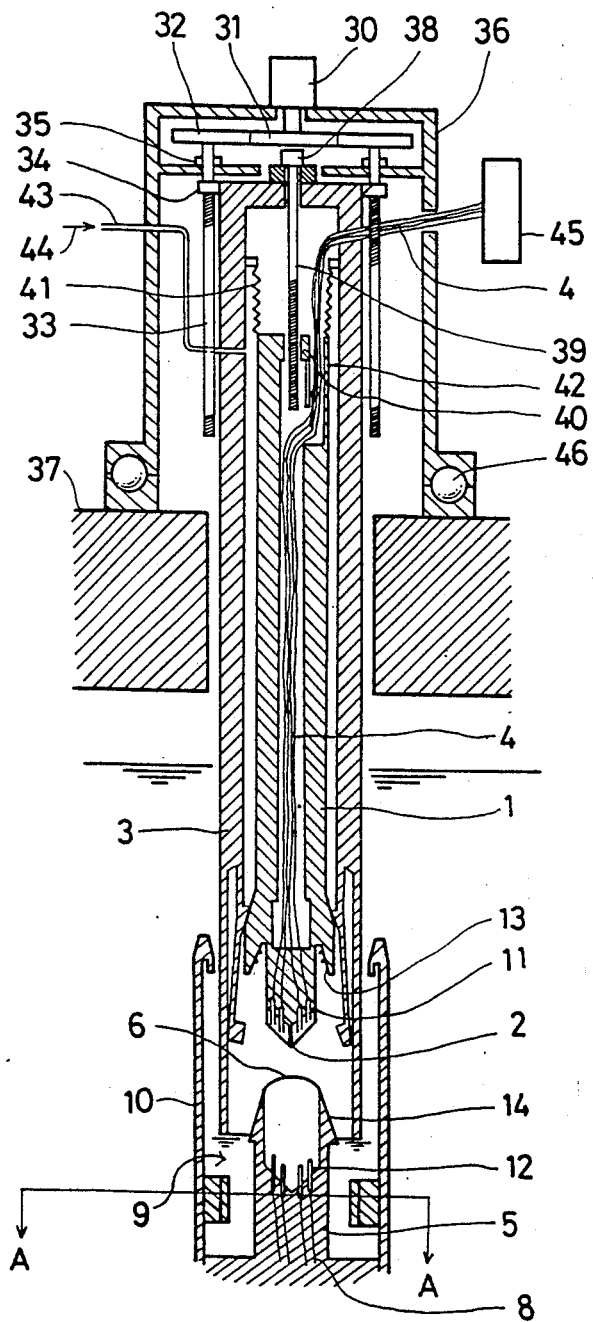
Figure 7B:
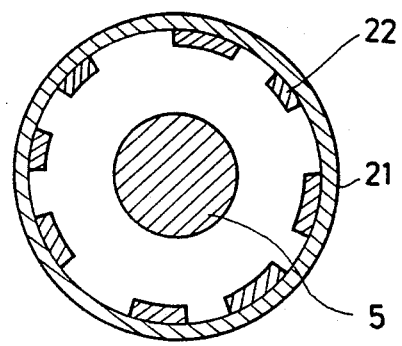
Figure 7C:
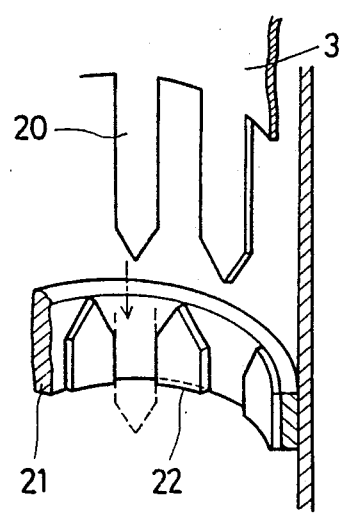
Figure 7D:
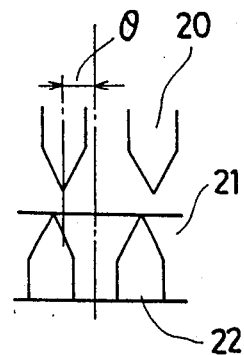
Figure 7E:
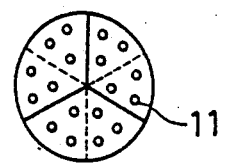

FIGS. 7(A) through 7(E) are for describing the circumferential angle adjustment of both connectors and the correction of the circumferential deviation, in which FIG. 7(A) is a sectional view of both connectors before connection, FIG. 7(B) is a sectional view taken along line A—A in FIG. 7(A), FIG. 7(C) is a partial perspective view for elucidating the correction of the angular deviation, FIG. 7(D) is a sectional view for elucidating the correction of the angular deviation, and FIG. 7(E) is a view showing a pin array in the case of a hexagonal connector. In the figures, numeral 20 denotes an angular-deviation connecting tooth, numeral 21 an angular deviation correcting guide, numeral 22 an angular-deviation correcting guide piece, and numeral 46 a bearing.

Referring to the Figures, the front end of the protecting tube 3 is provided with slots in a comb-line structure and is formed to include the angular-deviation correcting teeth 20 having circumferential widths unequal to one another as shown in FIG. 7(C). The angular-deviation correcting guide 21 is fixed on the inner surface of the irradiating fuel assembly 10 and is provided with the angular-deviation correcting guide piece 22 so as to define intervals corresponding to the respective widthwise dimensions of the angular-deviation correcting teeth 20 provided in the protecting tube 3 (FIG. 3). Moreover, the bearing 46 is disposed on the side of the connector A 1, and the whole structure supported by the foundation 37 is driven and rotated by drive means, not shown. In connecting both connectors, the connector A 1 is rotated by the drive means, not shown, in search of an angular position at which the respective teeth register with the corresponding intervals of the correcting guide pieces. Meanwhile, the lower ends of the angular-deviation correcting teeth 20 of the protecting tube 3 and the upper ends of the angular-deviation correcting guide pieces 22 of the irradiating fuel assembly 10 are provided with triangular inclined planes in the circumferential direction. Therefore, when the connector A 1 is inserted into the irradiating fuel assembly 10 under the aforementioned condition where it is rotated close to the registering angular position, the inclined planes of the confronting ends of the protecting tube 3 and the fuel assembly 10 butt against each other, and both connectors have their circumferential angular deviation $\theta$ corrected with ease and are thus disconnected. In this way, the corresponding pins of the connectors A and B are always connected smoothly while having their angular deviations corrected.

If it does not matter how the pins are connected, the angular-deviation correcting teeth 20 are formed into identical dimensions and the angular deviation correcting guide pieces 22 are arranged at equal intervals.

If the fuel assembly is hexagonal, the pins will connect even for an angular deviation of 60° if the pins are arrayed symmetrically at angles of 60°, as shown in FIG. 7(E). The solid line in the figure indicates the position of the connection end 11 of the connector A at a certain time, while the dotted line indicates the position thereof at the relative deviation of 60°. Even when the pins are mated with the deviation of 60° in this manner, the signal wires of the pins on the connector B side are already known. Therefore, the individual mated pins of the connector A can be readily identified. For example, several pins on the connector B side may be sacrificed and connected to known resistors or shortcircuited in advance. Then, after the connection of both connectors, the extension wires of the pins producing resistances are checked outside the connection apparatus.

Figure 8A:
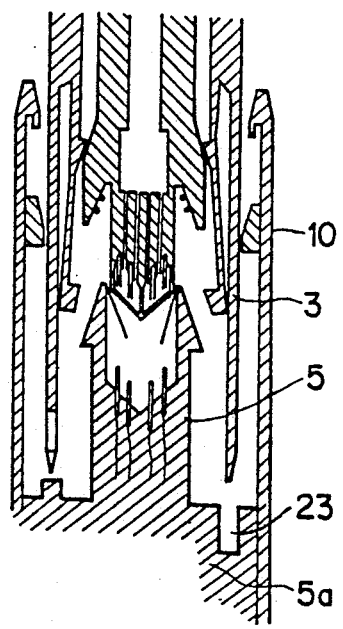
Figure 8B:
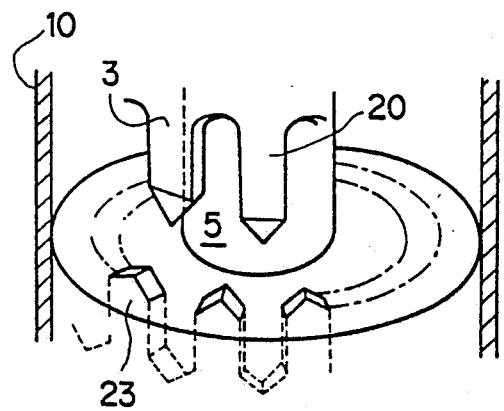

FIGS. 8(A) and 8(B) show another embodiment for correcting the circumferential deviation of both connectors, in which FIG. 8(A) is a sectional view of the front end parts of both connectors before connection, and FIG. 8(B) is a partial perspective view for elucidating the correction of the angular deviation. In the figures, numeral 23 indicates a toothed angular-deviation correcting guide.

As illustrated in FIGS. 8(A) and 8(B), the circumferential deviation may be corrected by providing the toothed angular-deviation correcting guide 23 for the purpose of permitting the angular-deviation correcting teeth 20 of the protecting tube 3 to enter a pedestal 5a at the lower part of the connector B 5.

In this case, the corresponding pins 11 and 12 can be mated by adopting an expedient wherein, as in the case of FIGS. 7(A) through 7(D), the widths of the correcting teeth 20 are made unequal and the toothed angular-deviation correcting guide 23 is formed so as to conform thereto.

Next, the protection of the connection end part will be described with reference to FIG. 9.

Figure 9:
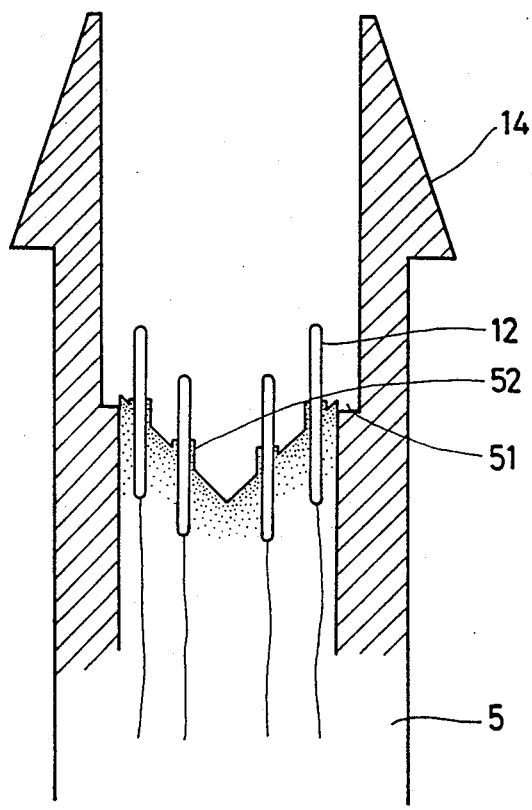
FIG. 9 is a sectional view of the front end part of a connector on the other side having its connection ends protected.

FIG. 9 is a sectional view of the front end part of the connector B having its connection pins protected. In the figure, numeral 51 denotes a recess and numeral 52 a protective insulator.

In a case where the liquid is an electrically conductive one such as sodium and where the connection pins are electrodes, the recess 51 is provided under the inner periphery of the sealing surface 14, which is the sagging lower part of the destructible plate 6, and the roots of the connection pins 12 of the connector B are covered with the protective insulator 52, with the latter swelling slightly above the base plane of the connection end, as illustrated in the figure. At the destruction of the destructible plate 6 by the protrusion 2 of the connector A 1, a small amount of the sodium adhering to the destructible plate 6 may enter the interior of the connector B 5 provided with the connection pins 12. Even if this should occur, however, drops of the sodium liquid accumulate in the recess 51. Further, even if the liquid sodium adheres to the connection pin 12, the protective insulator 52 at the root thereof prevents such accidents as a degradation in insulation and short-circuiting.

If the position of the connector B 5 in the liquid is deep, the gaseous presure is acting on the surface of the liquid or the specific gravity of the liquid is high, the head pressure of the liquid acting on the destructible plate 6 of the connector B 5 will increase and the destructible plate 6 might buckle or break down in extreme cases. It is therefore desirable to apply internal pressure to the closed space of the destructible plate 6 of the connector B 5 beforehand.

Figure 10:
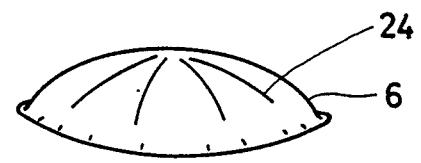
FIG. 10 is a view showing a domed destructible plate provided with domed rupture flaws.

When, as illustrated in FIG. 10, the destructible plate 6 is formed in the shape of a dome and is provided with rupture guide flaws 24 extending radially from the center thereof, the liquid can drain off better and the ruptured pieces of the destructible plate 6 can be made uniform.

Figure 11:
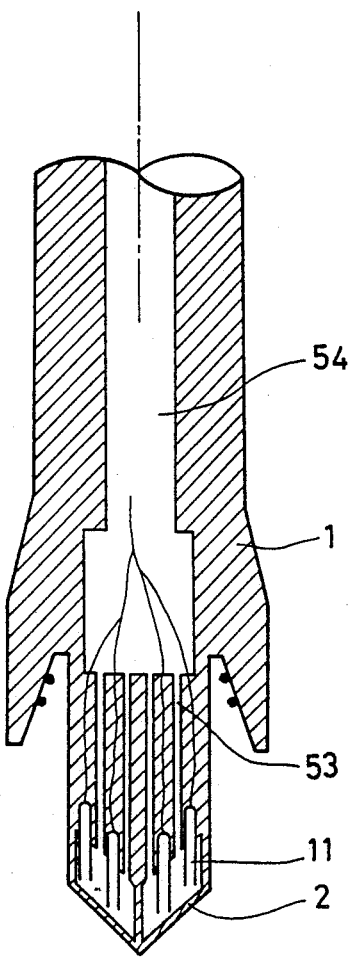
FIG. 11 is a view showing another embodiment of the connector on one side.

FIG. 11 is a view showing another embodiment of the front end part of the connector A 1. In the figure, numeral 53 designates a gas nozzle, and numeral 54 denotes a gas pipe.

Referring to the figure, the connector A 1 is provided with the gas pipe 54 for supplying a dry gas, and the front end thereof provided with the connection pins 11 is open at the gas nozzles 53. The jets of the gas are utilized for blowing off the liquid on the connector B 5. They also blow away and vaporize the wetness of the destructible plate 6 so as to dry the same. The jetted volume of gas raises the internal pressure of the protecting tube 3 and is emitted from the lower end of the protecting tube 3 into the liquid 9. In addition, when a similar operation is performed after the destruction of the destructible plate 6 and before the close contact of the sealing surfaces 13 and 14 of both connectors, the connection end 12 of the connector B 5 can be dried. Further, after the close contact of the sealing surfaces 13 and 14, the invasion of the liquid into the connection ends 11 and 12 can be prevented more reliably by keeping a fixed gaseous pressure exerted on the gas nozzles 53, and any degradation in the sealing performance of the seal structure can be ascertained by monitoring a decrease in the gaseous pressure. The nozzles can serve also as feed ports for exerting the gaseous pressure on the interior of the protecting tube 3, but naturally a pipe for introducing the internal pressure of the protecting tube 3 may be provided separately of the nozzles.

Figure 12A:
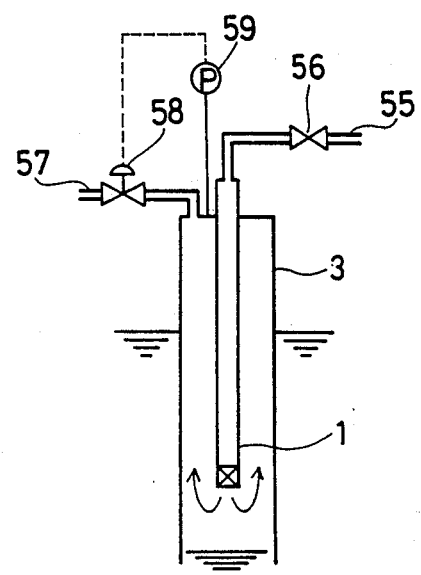
FIG. 12(A) is a view showing another embodiment of the present invention furnished with a gas feed line and a gas exhaust line.

FIG. 12(A) is a view showing another embodiment in which the gas compressedly fed into the nuclear reactor is not emitted into the liquid. In the figure, numeral 55 indicates a gas feed line, numeral 56 a valve, numeral 57 a gas exhaust line, numeral 58 a control valve, and numeral 59 a pressure gauge.

In the interior of a reactor vessel, it is undesirable for the gas bubbles to be emitted into the liquid from the lower end to the protecting tube 3 and to float therein. In such case, the protecting tube 3 is furnished with the gas feed line 55 and the gas exhaust line 57 as illustrated in the figure, and the gas corresponding to the fed amount is exhausted by regulating the control valve 58 while the internal pressure of the protecting tube 3 is being monitored by the pressure gauge 59. Thus, the gas can be jetted from the front end of the connector A 1 to form the gaseous space without the gas being emitted into the liquid. In this case, it is also permissible to hold the rate of exhaust constant and to control the valve 56 on the gas feed side.

Figure 12B:
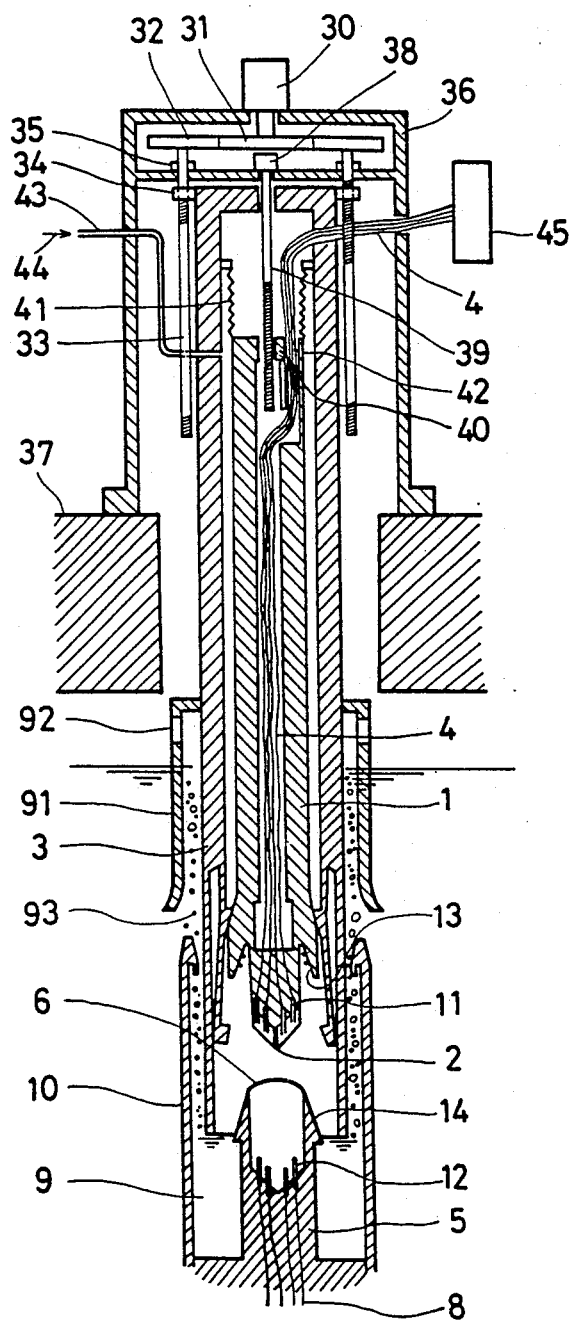
FIG. 12(B) is a view showing still another embodiment in which a gas compressedly fed into a nuclear reactor is not emitted into a liquid.

FIG. 12(B) is a view showing still another embodiment in which the gas compressedly fed into the nuclear reactor is not emitted into the liquid. In the figure, numeral 91 indicates a gas collecting cylinder, numeral 92 a gas emitting aperture, and numeral 93 a bubble.

Referring to the figure, the gas collecting cylinder 91 integrated with the protecting tube 3 is provided outside the protecting tube, and the gas emitting apertures 92 are provided in the upper part of the gas collecting cylinder 91.

By virtue of such a construction, the fed gas overflows from the lower end of the protecting tube 3 and floats within the sodium to rise in the form of the bubbles 93, but the bubbles pass inside the gas collecting cylinder 91 disposed directly above the lower end of the protecting tube 3 and are emitted into the cover gas space of the nuclear reactor through the gas emitting apertures 92. Accordingly, the bubbles 93 having come out of the lower end of the protecting tube 3 do not mix in the circulating sodium to adversely affect a pump or another fuel assembly.

As compared with the preceding embodiment of FIG. 12(A), the present embodiment does not require the gas exhaust line 57, control valve 58 and pressure gauge 59 and is capable of sending the contaminated feed gas to an exhaust gas disposal system originally possessed by the nuclear reactor, without any piping.

FIGS. 13(A) and 13(B) show another embodiment of the present invention permitting connection portions to be cleansed and dried, in which FIG. 13(A) is a sectional view of the front end of the connector A, and FIG. 13(B) is a view showing the mated state of the connectors A and B. In the figures, numeral 60 indicates a fluid nozzle, and numeral 61 a fluid recovery port.

Referring to the figures, the front end part of the connector A 1 is provided with the fluid nozzles 60 and the fluid recovery ports 61, which are piped from outside independently of each other. After both connectors A and B have been connected to form the sealing structure, a mixed fluid consisting of steam and an inert gas for the case of the sodium liquid is fed and jetted through the fluid nozzles 60, whereby the interiors of the connector A 1 and connector B 5 are cleansed. The fluid is recovered and discharged through the fluid recovery ports 61. The interiors of both connectors can be cleansed without leakage of the cleansing fluid. After the completion of cleansing, the fluid is switched over to a dry gas outside the reactor vessel and the dry gas is jetted through the fluid nozzles 60 and exhausted through the fluid recovery ports 61. This will dry the interiors of the connectors A and B.

Figure 14A:
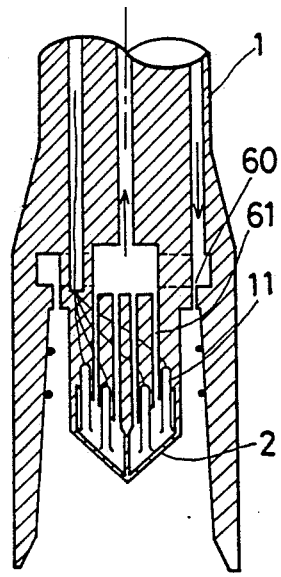
Figure 14B:
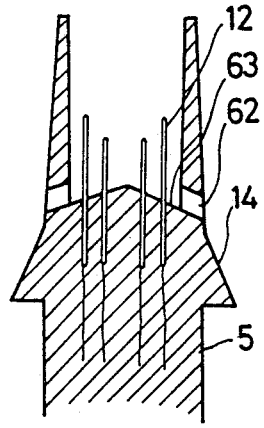
Figure 14C:
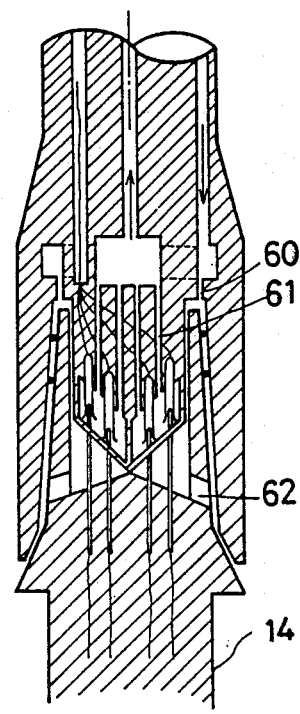
Figure 15:
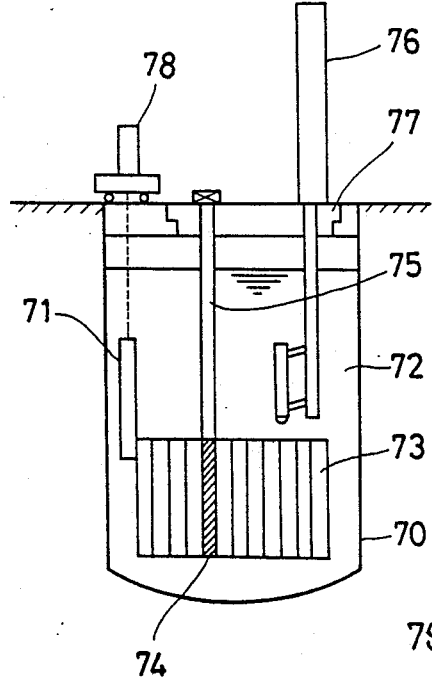
FIG. 15 is a view for describing the fuel shuffling of a nuclear reactor.
Figure 16:
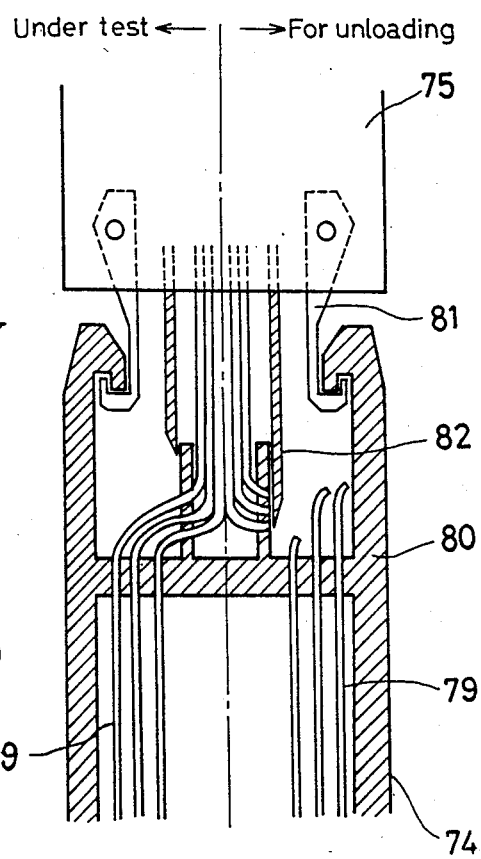
FIG. 16 is a view for describing the charging of an irradiating fuel assembly in the reactor according to the prior art.

FIGS. 14(A) through 14(C) show another embodiment providing the connector B with drain ports, in which FIG. 14(A) is a sectional view of the front end of the connector A, FIG. 14(B) is a sectional view of the front end of the connector B, and FIG. 14(C) is a view showing the mated state of the connectors A and B. In the figures, numeral 62 indicates the drain port, and numeral 63 an inclined face.

Referring to the figures, the fluid nozzle 60 of the connector A 1 is open to the outer peripheral side of the protrusion 2 as illustrated in FIG. 14(A), and the surface of the root parts of the connection terminals of the connector B 5 is formed into the inclined face 63 and is surrounded with the drain ports 62 as illustrated in FIG. 14(B), thereby being adapted to drain off the liquid. Accordingly, even when the liquid is taken up onto the surface of the root parts of the connection terminals of the connector B, it flows out of the drain ports 62. Both of the connectors are connected under these conditions. In the state shown in FIG. 14(C) in which both connectors have been thus connected, the cleansing or dry gas is jetted through the fluid nozzles 60, whereby the connection terminals 11, 12 and the inclined face 63 are cleansed r dried. Moreover, a dry condition and a gastight condition can be maintained by keeping the dry gas supplied in this state.

According to the present embodiment, the connector B 5 can be repeatedly used by cleaning and reproducing the connection end 12 even when the connector B 5 is exposed to the liquid after the separation of the connector A 1 from the connector B 5. Moreover, since the connector B 5 can be dried by draining off the liquid and blowing the gas against it, the destructible plate 6 is not always necessary in this case.

In the above, a case has been described in which the electrically conductive sodium is used as the liquid and the transmission signals are electric signals. However, the present invention is readily applicable to liquids in general such as water, oil and chemical and to signals to be transmitted including low-power signals for mere measurement, high-power signals for drive, and gas, oil or any other fluid confined in a hose.

According to the present invention as described above, it is possible to connect and disconnect connection portions in a liquid without the portions becoming wet. When a connector on one side is installed so as to move in the horizontal direction, the single connector can be successively connected with a large number of connectors on the other side, thereby making it possible to reduce equipment and to utilize space effectively. Moreover, since a transmission path and a passage for transporting equipment into the liquid can be separated, greater flexibility is available for equipment design. In addition, it is easier to exchange the equipment in the liquid and the maintenance thereof is facilitated.

As many apparently widely different embodiments of the present invention can be made without departing from the spirit and scope thereof, it is to be understood that the invention is not limited to the specific embodiments thereof except as defined in the appended claims.

What we claim is:

1. An apparatus for making a connection in a liquid, comprising:
    a vertically movable protecting tube which is open at its lower end and which is compressedly fed with a gas to form a gaseous space therein within said liquid;
    a first connector which is held vertically movable inside said protecting tube and which includes a fluid nozzle and a fluid recovery port in its front end; and
    a second connector to be connected with said first connector, which is normally held in said liquid and which includes drain ports that are exposed to said gaseous space formed in said protecting tube and can discharge portions of said liquid contained in said second connector when the first and second connectors are joined.

2. The apparatus according to claim 1, wherein said liquid is sodium liquid.

3. The apparatus according to claims 1 or 2, wherein a surface of said second connector provided with electrodes has its central part swollen and inclined toward said drain ports.

4. The apparatus according to claims 1 or 2, wherein said second connector is arranged in a fuel assembly for irradiation.

5. An apparatus according to claims 1 or 2, wherein vertical movements of said protecting tube and said first connector are performed by respective driving motors.

6. The apparatus according to claims 1 or 2, wherein said first connector and said second connector have sealing surfaces which come into close contact with each other at said connecting step.

7. The apparatus according to claims 1 or 2, wherein said first connector comprises a gas feed line and a gas exhaust line, and a rate of gas feed or gas exhaust is controlled to prevent said gas forming said gaseous space within said liquid inside said protecting tube from being emitted into said liquid outside said protecting tube.

8. The apparatus according to claims 1 or 2, wherein said protecting tube is unitarily provided on its outer side with a gas collecting cylinder which has gas emitting apertures at its upper part.

9. The apparatus according to claims 1 or 2, wherein said protecting tube comprises an elastic member suspended at its front end, said elastic member including an inclined projection at a base part thereof and a pawl at a fore end thereof, and at the step of connecting said connectors, said elastic member is spread out by sliding pressing engagement of said inclined projections with an outer peripheral tapered surface of said first connector, and is restored by releasing the sliding pressing engagement, to bring said pawl into fitted engagement with a fitting portion of said second connector.

10. The apparatus according to claims 1 or 2, wherein when a deviation of central axes of both said first and second connectors has developed at the connecting step, a tapered face of the protrusion at the front end of said first connector butts against a peripheral edge of said second connector to correct the axial deviation.

11. The apparatus according to claim 4, wherein the irradiating fuel assembly is provided on its inner surface with an axial-deviation correcting guide which engages the front end of said protecting tube.

12. The apparatus according to claim 4, wherein said protecting tube is formed to include teeth at its front end, and the irradiating fuel assembly is provided on its inner surface with an angular-deviation correcting guide which engages said teeth.

13. The apparatus according to claim 12, wherein circumferential widthwise dimensions of said teeth differ from one another, and said angular-deviation correcting guide is formed to as to correspondingly engage said teeth.

14. The apparatus according to claims 1 or 2, wherein said each connector has pins arrayed symmetrically at angular intervals of 60°.

15. The apparatus according to claims 1 or 2, wherein said protecting tube is provided with teeth at its front end, and said second connector is provided in a lower pedestal thereof with a toothed angular-deviation correcting guide which is snugly engageable with said teeth.

* * * * *